L. D. BARNEY.
LAWN SPRINKLING SYSTEM.
APPLICATION FILED APR. 12, 1911. RENEWED OCT. 21, 1912.
1,046,427.  Patented Dec. 10, 1912.
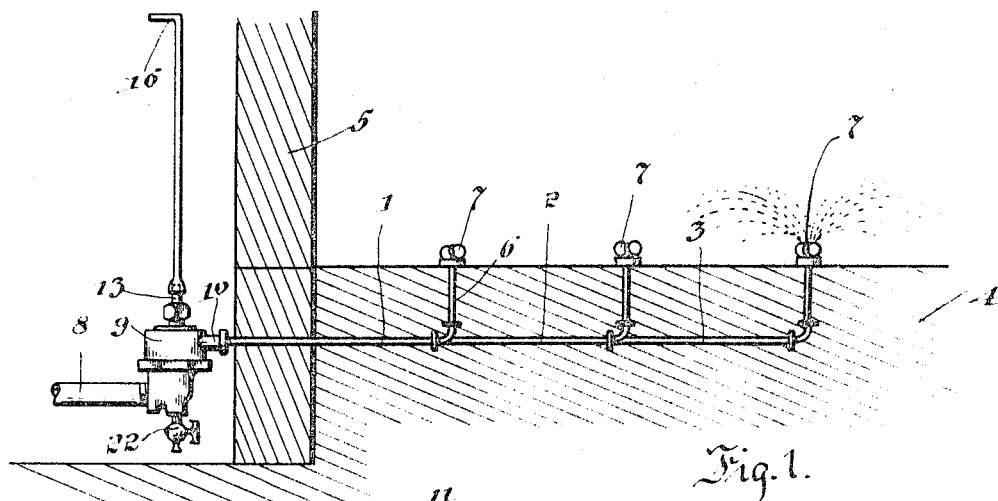
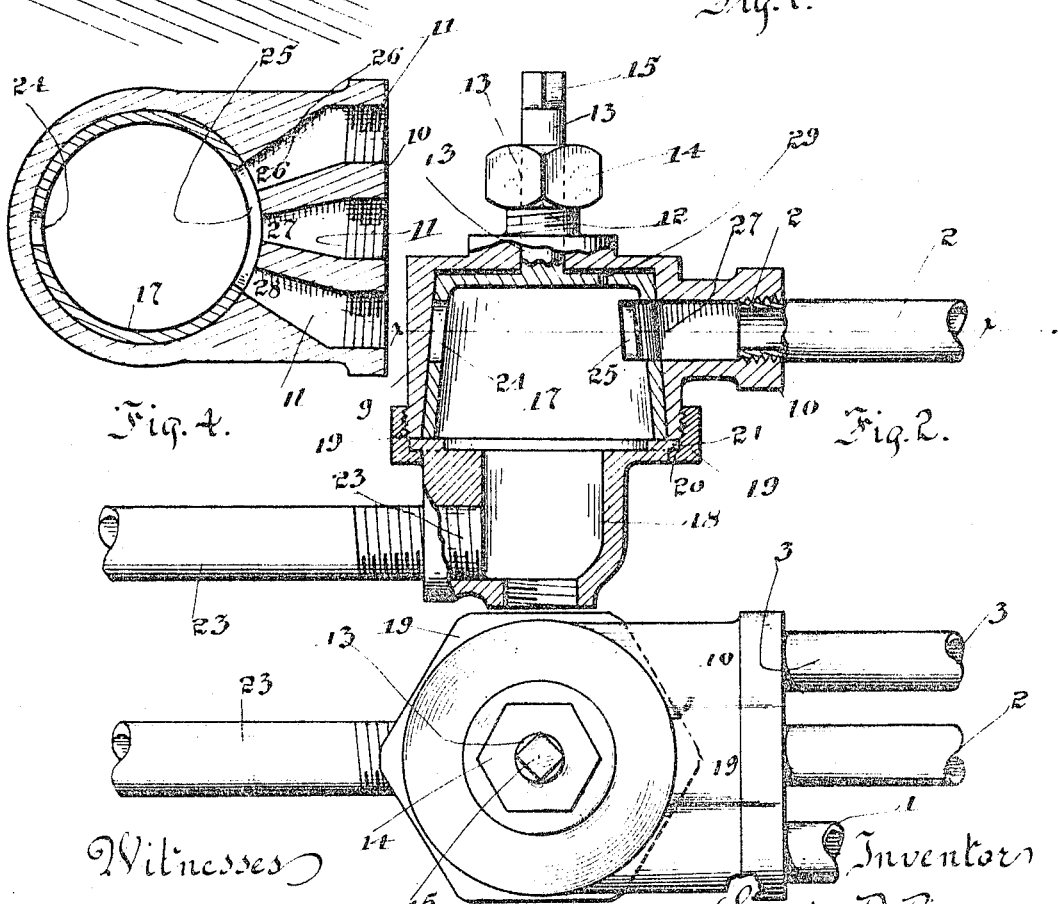

UNITED STATES PATENT OFFICE.

LOUIS D. BARNEY, OF CHICAGO, ILLINOIS.

LAWN-SPRINKLING SYSTEM.

1,046,427. Specification of Letters Patent. Patented Dec. 10, 1912.

Application filed April 12, 1911, Serial No. 620,529. Renewed October 21, 1912. Serial No. 727,063.

*To all whom it may concern:*

Be it known that I, LOUIS D. BARNEY, a citizen of the United States, and a resident of the city of Chicago, county of Cook, and State of Illinois, have invented certain new and useful Improvements in Lawn - Sprinkling Systems, of which the following is a specification.

My invention relates to improvements in lawn sprinkling systems and has for its object the production of a new and improved distributing valve to be employed in the system which shall be simple of construction and efficient in operation.

A further object of my invention is to provide a valve as stated for distributing water to various spraying nozzles and which is capable of being easily controlled by an operator.

Other objects will appear hereinafter.

With these objects in view my invention consists in the novel construction and arrangement of parts all as will be hereinafter more fully described and more particularly pointed out in the appended claims.

My invention will be best understood by reference to the accompanying drawing forming a part of this specification, and in which—

Figure 1 is a sectional view of a lawn and a portion of an adjacently located house in which my improved valve is installed, Fig. 2 is a vertical section of the distributing valve, Fig. 3 is a top plan view of said valve, and Fig. 4, is a horizontal section taken on line *x—x* of Fig. 2.

The preferred form of construction of my invention as illustrated in the accompanying drawing comprises a series of water pipes 1, 2 and 3 which are of different lengths and buried in the ground 4 adjacent the basement 5 of a house as diagrammatically indicated in Fig. 1. Extending vertically from the ends of the pipes 1, 2 and 3 are pipes 6 the upper ends of which are provided with spraying nozzles 7. Any form of spraying nozzle may be used, but the rotary type is preferred. The pipes 1, 2 and 3 lead from the basement 5 and are connected with the distributing valve, as clearly illustrated in Figs. 2 and 3. The distributing valve is supplied with water by a water pipe 8 in which is provided a suitable controlling cock, not shown.

The distributing valve comprises a substantially cylindrical chamber 9 the axis of which is vertically disposed. Extending radially from the chamber 9 is a projection 10 in which threaded sockets 11 are provided for the reception of the pipes 1, 2 and 3. An axially arranged threaded boss 12 is provided on the top of the chamber 9 in which a valve stem 13 is journaled, an ordinary stuffing box 14 being screwed to the threaded boss 12 for preventing the escape of water around the valve stem 13. Said valve stem is provided with a squared extremity 15 to receive an operating key 16. The operating key 16 may be of any desired length, for instance it may extend from the basement of the house to the first or second stories as desired. A truncated conical member 17 is provided in the valve and formed integral with the stem 13 by means of which it is rotated. The chamber 9 is bored to fit the exterior surface of the member 17 as clearly illustrated in Fig. 2, the lower edge of the member 17 being formed flush with the lower edge of the chamber 9. In order to retain the member 17 in position in the chamber 9 a sub-member 18 is provided and secured to the chamber 9 by means of a threaded ring 19. The ring 19 comprises an inwardly extending flange 20 which engages under a peripheral flange 21 of the member 18. It is apparent from this construction that when the ring 19 is screwed securely to the chamber 9 that a tight joint will be formed between the rotary member 17 and the member 18, thus precluding the possibility of any escape of water. The lower end of the member 18 is provided with a pet cock 22 for draining off any impurities or sediment which may collect in the valve. The main water pipe 23 is screwed into the member 18 as illustrated in Fig. 2, said member therefore forming an ante-chamber from which water is delivered to the space within the member 17. The periphery of the member 17 is provided with a short circumferential port 24 and an elongated circumferential port 25, these ports being arranged in the same radial plane. The sockets 11 in which the pipes 1, 2 and 3 are secured are arranged in communication with ports 26, 27 and 28, these latter registering with the ports 24 and 25 as will be clear by reference to Fig. 2. A small perforation 29 is provided in the top of the member 17 in order to alleviate the friction between the upper surface thereof and the corresponding interior surface of the chamber 9. The friction is lessened by partially balancing the valve, water from the member 17 flowing through the perforation 29 to the top surface of said member tending to neutralize the water pressure exerted on the upper interior surface of said member. It will be seen, however, that the perforation 29 cannot fully balance the valve since the area of the uppermost surface of the member 17 which exerts the pressure downwardly is less than the area of the surface which exerts an upper pressure. The small difference of pressure is of advantage since the desired contact is maintained between the periphery of the member 17 and the corresponding interior surface of the chamber 9.

The distributing valve is operated as follows: Assuming the member 17 to be in position shown in Fig. 4, then the water will flow freely to all of the spraying nozzles 7 which are illustrated in Fig. 1. If, however, it is desired to use only two of the spraying nozzles, then the key 16 is turned slightly in one direction. This action will close one of the ports, the other two remaining open. Further movement of the member 17 will close another port, and still further movement will effect closing of all the ports shutting off the water from all the spraying nozzles. After a rotation approximately of 180 degrees of the member 17 the port 24 will come into registration with one of the ports 26, 27 and 28. When this port 24 is employed only one of the spraying nozzles can be used and the amount of water delivered to said spraying nozzle can be easily controlled by slightly turning the key 16 as will be readily understood by those skilled in the art.

A distributing valve of the construction set forth is easy of manipulation, simple of construction and efficient in operation.

While I have illustrated and described the preferred form of construction for carrying my invention into effect, this is capable of variations and modifications without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:—

1. In a lawn sprinkler system, a valve chamber having a frusto-conical bore the axis of which is vertically disposed, said bore being provided with a series of ports leading radially therefrom, a plurality of pipe sockets arranged in communication with said ports, pipes screwed into said sockets, a water ante-chamber arranged under said valve chamber and rigidly secured thereto, means for draining said ante-chamber for the discharge of sediment collected therein, a water pipe leading into said ante-chamber, a rotary valve fitted into the frusto-conical bore of said valve chamber and having a pair of diametrically opposed ports for registration with the ports of said valve chamber, the lower edge of said rotary valve being flush with the lower edge of said valve chamber and seated on the upper surface of said ante-chamber, said valve chamber having an axial opening extending through the top thereof, a valve stem formed on said rotary valve and journaled in said axial opening, and a squared portion at the upper end of said valve stem for the reception of an operating key, substantially as described.

2. A valve for lawn sprinkler systems comprising a substantially cylindrical valve chamber having threaded sockets, a plurality of water discharge pipes screwed into said sockets, an ante-chamber disposed under said valve chamber having a peripheral flange at the upper edge thereof, the diameter of the periphery of said flange being co-extensive with the diameter of the periphery of said valve chamber, the exterior surface of the lower edge of said valve chamber being threaded, a ring having an internal thread screwed onto the threaded portion of said valve chamber, an inwardly extending flange on said ring engaging under the flange of said ante-chamber, a water pipe leading into said ante-chamber for supplying water thereto, a drain cock screwed into the bottom wall of said ante-chamber for draining off sediment therefrom, a rotary valve mounted in said valve chamber and having a frusto-conical peripheral surface, said valve chamber being bored to receive said valve, the lower edge of said valve being flush with the lower edge of said valve chamber and seated on the upper surface of said ante-chamber, said rotary valve having a top with a perforation therein, said valve chamber having a top fitted to the top of said valve, an axial stem extending upwardly from the top of said valve and squared at its upper extremity, there being an axial opening in said valve chamber in which said stem is journaled, said valve being provided with a pair of diametrically opposite ports one of which is long and the other short circumferentially, and the arrangement of said valve ports being such as to adapt them to register with ports in said valve chamber, substantially as described.

In testimony whereof I have signed my name to this specification in the presence of two subscribing witnesses.

LOUIS D. BARNEY.

Witnesses:
Joshua R. H. Potts,
W. C. Smith.